United States Patent
Baldwin et al.

(10) Patent No.: US 10,064,075 B2
(45) Date of Patent: Aug. 28, 2018

(54) MOBILE COMMUNICATION TERMINAL TEST DEVICE AND MOBILE COMMUNICATION TERMINAL TEST METHOD

(71) Applicant: ANRITSU CORPORATION, Kanagawa (JP)

(72) Inventors: Simon Baldwin, Luton (GB); Mohamed El Gabbouch, Luton (GB); Duncan Charles James-Bell, Luton (GB); Steven Philip Larcombe, Luton (GB); Natasha Collinson, Luton (GB)

(73) Assignee: ANRITSU CORPORATION, Kanagawa (JP)

( * ) Notice: Subject to any disclaimer, the term of this patent is extended or adjusted under 35 U.S.C. 154(b) by 175 days.

(21) Appl. No.: 14/748,919

(22) Filed: Jun. 24, 2015

(65) Prior Publication Data

US 2015/0382213 A1 Dec. 31, 2015

(30) Foreign Application Priority Data

Jun. 25, 2014 (GB) .................................. 1411260.1

(51) Int. Cl.
*H04W 24/06* (2009.01)
*H04W 24/10* (2009.01)

(52) U.S. Cl.
CPC ............ *H04W 24/06* (2013.01); *H04W 24/10* (2013.01)

(58) Field of Classification Search
USPC .................................... 455/423, 67.11, 67.14
See application file for complete search history.

(56) References Cited

U.S. PATENT DOCUMENTS

| | | | | |
|---|---|---|---|---|
| 2003/0231741 | A1* | 12/2003 | Rancu ................... | H04M 3/303 379/9 |
| 2006/0003810 | A1* | 1/2006 | Saikyo .................. | H04W 24/06 455/566 |
| 2006/0009159 | A1* | 1/2006 | Leung ................. | H04L 12/2697 455/67.11 |
| 2006/0094416 | A1* | 5/2006 | Endo ..................... | H04W 24/06 455/423 |
| 2013/0346948 | A1* | 12/2013 | Zhang ................. | G06F 11/3684 717/125 |
| 2014/0092750 | A1* | 4/2014 | Aoki ..................... | H04W 24/00 370/241 |

FOREIGN PATENT DOCUMENTS

| | | |
|---|---|---|
| EP | 1613110 A2 | 1/2006 |
| JP | 2006050567 A | 2/2006 |

\* cited by examiner

*Primary Examiner* — Nay A Maung
*Assistant Examiner* — Erica Fleming-Hall
(74) *Attorney, Agent, or Firm* — Pearne & Gordon LLP (57) ABSTRACT

A mobile communication terminal test device communicates with a mobile communication terminal to perform a test operation. The test device comprises a display unit, a test engine unit that determines a test procedure to be executed as part of the test operation and communicates the test procedure to a test execution unit which executes the test procedure and returns an outcome of the test procedure execution to the test engine unit, and a display control unit that displays a screen indicating a hierarchical trace of executed test procedures and their outcomes, on the display unit.

16 Claims, 10 Drawing Sheets

Figure 3 (part 1 of 2)

Figure 3 (part 2 of 2)

MOBILE COMMUNICATION TERMINAL TEST DEVICE AND MOBILE COMMUNICATION TERMINAL TEST METHOD

FIELD OF THE INVENTION

The present invention relates to a mobile communication terminal test device that communicates with a mobile communication terminal to perform a test operation, such as an operation of evaluating the performance of the mobile communication terminal, and can display various kinds of information, such as information about the state of the test operation.

BACKGROUND AND PRIOR ART

When mobile communication terminals typified by mobile phones are developed, a mobile communication terminal test device is used to test whether the mobile communication terminal under development operates as designed and whether the mobile communication terminal normally operates according to a communication standard. A test scenario in which the operation sequence and communication sequence of the mobile communication terminal test device are described is created in advance and stored, and the mobile communication terminal test device operates as a pseudo mobile network, simulating the behaviour of multiple elements in the network such as base station, mobile switching centre, packet gateway servers according to the test scenario. Then, the tester (developer) uses the mobile communication terminal test device to communicate with the mobile communication terminal to be tested and checks the operating state of the mobile communication terminal and a communication state between the mobile communication terminal and the mobile network with reference to log information during communication, thereby testing whether the mobile communication terminal conforms to required standards and can communicate and behave normally.

With the evolution of mobile communication technology, an increasing number of communication standards exist. The staged rollout of new communication technology demands that mobile communication terminals are able to communicate with a wide range of mobile communication technologies, protocols and base station standards. As such, mobile communication terminal test devices are designed to simulate a plurality of communication bands, protocols and standards so that a mobile communication terminal can be tested against modern standards and also regression tested against older standards. Examples of protocols a mobile communication terminal may be tested against includes Long Term Evolution (LTE), LTE-Advanced (a next-generation standard of LTE), third generation partnership project (3GPP or simply 3G), Edge, and GSM (global system for mobile communications to name a few.

The requirement to develop a test scenario which can evaluate whether a mobile communication terminal is correctly operating across a wide range of standards and communication protocols necessarily requires a complex set of test procedures which may be produced by different test developer groups and then combined into a single test scenario. A person testing a mobile communication terminal wants to be able to inspect the status of the test scenario either during the execution of the test or afterwards in order to determine the point at which a mobile communication terminal no longer correctly operated. However displaying such information in a meaningful manner to a user given the complex nature of the test scenario has been challenging.

In order to check the state of operation of the mobile communication terminal, it is necessary to analyse and check the content of the test scenario in which the settings and test procedure of the mobile communication terminal test device are described or log information during communication. In this case, it takes a lot of time and effort to analyse and check the content of the test scenario and it is difficult to analyse and check the content of the log information due to the very large amount of data contained therein.

The invention has been made in view of the above-mentioned problems and an object of the invention is to provide a mobile communication terminal test device and a mobile communication terminal test method which can better aid a person testing a mobile communication terminal.

SUMMARY OF THE INVENTION

In accordance with a first aspect of the invention there is provided a mobile communication terminal test device that communicates with a mobile communication terminal to perform a test operation, comprising:
  a display unit;
  a test engine unit that determines a test procedure to be executed as part of the test operation and communicates said test procedure to a test execution unit;
  a test execution unit that executes said test procedure and returns an outcome of said test procedure execution to the test engine unit;
  a display control unit that displays a screen indicating a hierarchical trace of executed test procedures and their outcomes, on the display unit.

Preferably, the display control unit displays a screen indicating a hierarchical trace of executed test procedures arranged by nested execution level, whereby a child test procedure determined by the test engine unit to be executed as part of executing a parent test procedure is indicated by the display control unit at a lower nested execution level than the parent test procedure.

Preferably, the test engine unit stores a test log, each entry in the test log corresponding to either a test procedure determined to be executed or an outcome of a test procedure execution received from the test execution unit, the test engine unit storing a timestamp with each entry in the test log, the display control unit creating the hierarchical trace from entries in the test log. In one arrangement, the display control unit determines the nested execution level of each test procedure based on the timestamps of test log entries. In an alternative arrangement, the display control unit requests the nested execution level of each test procedure from the test engine unit.

Preferably, the display control unit displays only executed and executing test procedures in the hierarchical trace. In one arrangement the display control unit displays outcomes of executed and executing test procedures in the hierarchical trace, and further displays branch indicators connecting a determined outcome of each executed test procedure to the subsequently executed test procedure.

Preferably, each test procedure definition may include a breakpoint. The test engine unit is arranged to ignore each breakpoint such that execution of test procedures in each test operation continues irrespective of break points. The display control unit is arranged to respond to break points by pausing the hierarchical trace on the display unit until a resume input is received from a user.

In an alternative arrangement, the display control unit displays a tracking display toggle on the display unit, the display control unit responding to a user selection of the tracking display toggle by pausing the hierarchical trace on the display unit until a resume input is received from a user.

In accordance with a second aspect of the invention there is provided a method for testing a mobile communication terminal by performing a test operation, comprising the steps of:

determining a test procedure to be executed as part of a test operation;

executing said test procedure and returning an outcome of said test procedure execution; and displaying a screen indicating a hierarchical trace of executed test procedures and their outcomes, on a display unit.

Preferably, the step of displaying a screen further comprises indicating a hierarchical trace of executed test procedures arranged by nested execution level, whereby a child test procedure determined to be executed as part of executing a parent test procedure is displayed at a lower nested execution level than the parent test procedure.

Preferably, the method further comprises the steps of storing entries in a test log, each entry in the test log corresponding to either a test procedure determined to be executed or an outcome of a test procedure execution, and storing a timestamp with each entry in the test log, wherein the step of displaying a screen indicating a hierarchical trace of executed test procedures further comprises retrieving entries from the test log and displaying the screen based on the retrieved entries.

Preferably, the method further comprises the step determining the nested execution level of each test procedure based on the retrieved test log entries.

Preferably, the step of displaying a screen comprises displaying only executed and executing test procedures in the hierarchical trace.

Preferably, each test procedure definition may include a breakpoint, the method further comprising the steps of continuing execution of test procedures irrespective of break points and pausing displaying a screen upon encountering a breakpoint until a resume input from the user is received.

Preferably, the method further comprises the step of pausing the hierarchical trace on the display unit in response to a pause input from a user until a resume input is received from a user, and continuing to perform the steps of determining a test procedure to be executed and executing said test procedure while the hierarchical trace is paused.

BRIEF DESCRIPTION OF THE FIGURES

The invention will now be described with reference to the accompanying drawings, in which.

DESCRIPTION OF PREFERRED EMBODIMENTS

Figure 1:
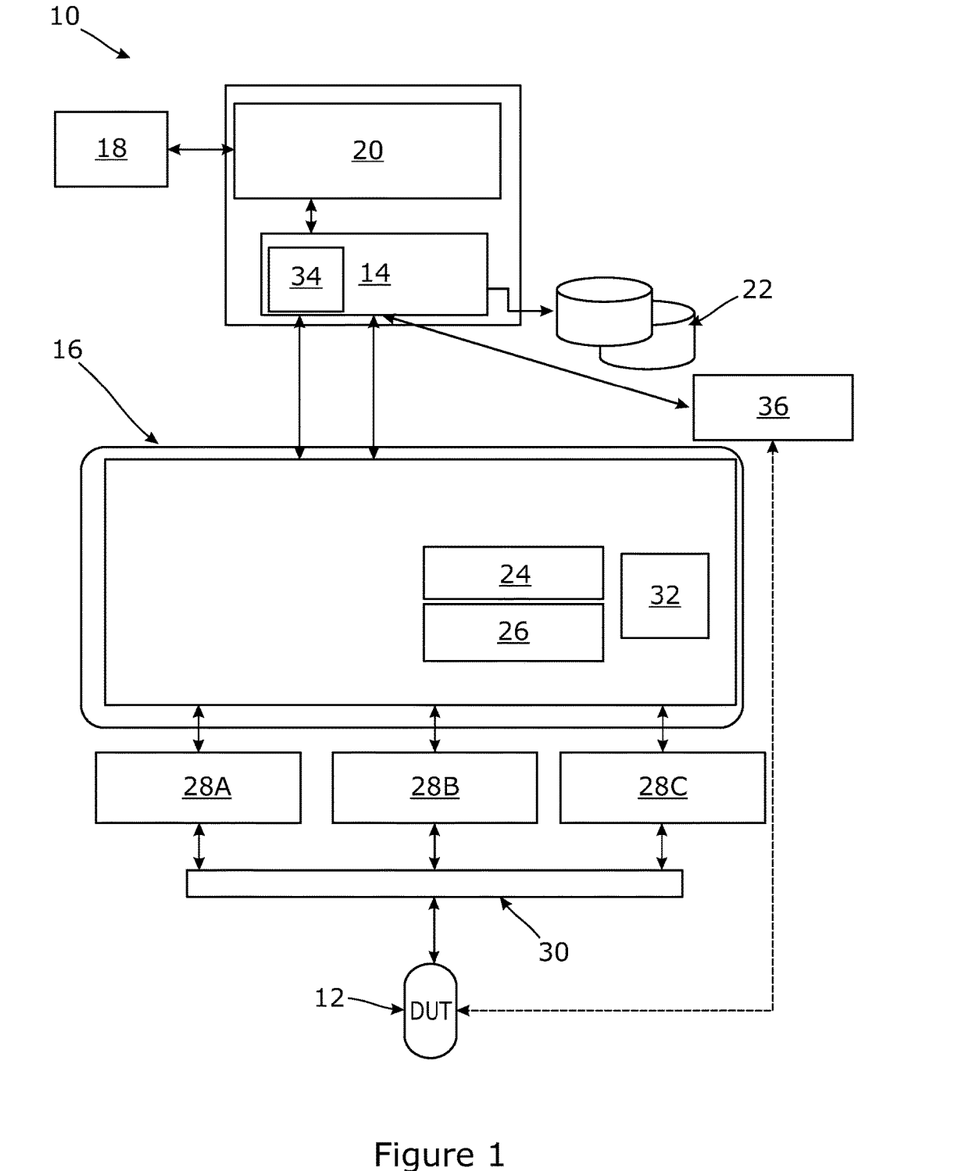
FIG. 1 is a block diagram of a mobile communication terminal test device according to an embodiment of the invention.

FIG. 1 shows a block diagram of the mobile communication terminal test device 10 according to the embodiment which communicates with a mobile communication terminal 12 to perform a test operation.

The mobile communication terminal test device 10 comprises a test engine unit 14 having a test procedure library 22, a test execution unit 16 having an execution procedure library 24, and a display control unit 20 which displays a screen on a display unit 18. The device 10 further comprises hardware instruments 28A to 28C each of which has a radio frequency output that is connected to an RF combiner 30 for sending and receiving signals to and from the mobile communication terminal 12 via an antenna or a cable (not shown). The execution procedure library includes an executable procedure for each test procedure in the procedure library 22.

The test procedure library 22 of the embodiment comprises a procedure definition for each test operation and test procedure. Each procedure definition includes a unique identifier, one or more parameters and test outcomes, a list of any child test procedures to be executed, and branch information defining a test flow as will be described in more detail below.

In the embodiment, the procedure definitions in the test procedure library 22 are stored in extended mark-up language (XML) format. Since each procedure definition is a self-contained specification of a test operation or test procedure, procedure definitions can be defined that call other test procedures (hereafter called "compound text procedures"), allowing sophisticated test procedures to be created. Further, test campaigns can be built by specifying a list of test operations to be performed in that campaign.

Figure 2A:
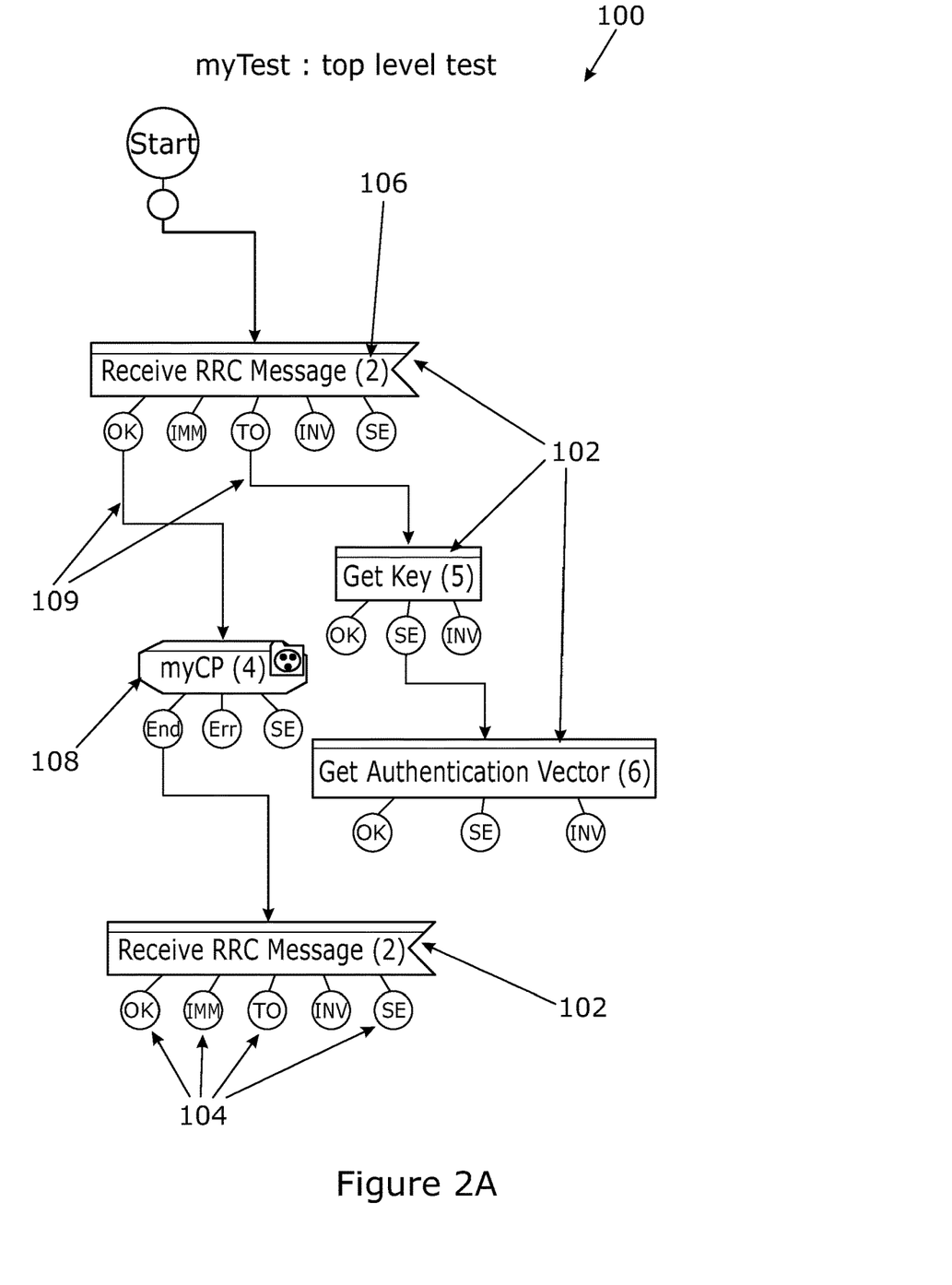
FIG. 2a-2d are example flow diagrams showing nested test procedures of a test operation.

Referring now to FIG. 2, an example of a test operation 100 is shown at FIG. 2A. The test operation 100 comprises test procedures 102 and a compound test procedure 108, each of which has several test outcomes 104 and a test procedure identifier 106. Branch indicators 109 connect test outcomes to test procedures to define an execution flow of the test operation 100. The graphical display of the test operation 100 presents a simpler interface to a user and allows for more rapid design of tests without requiring detailed knowledge of the test execution language used by the procedure libraries and protocol layers.

Figure 2B:
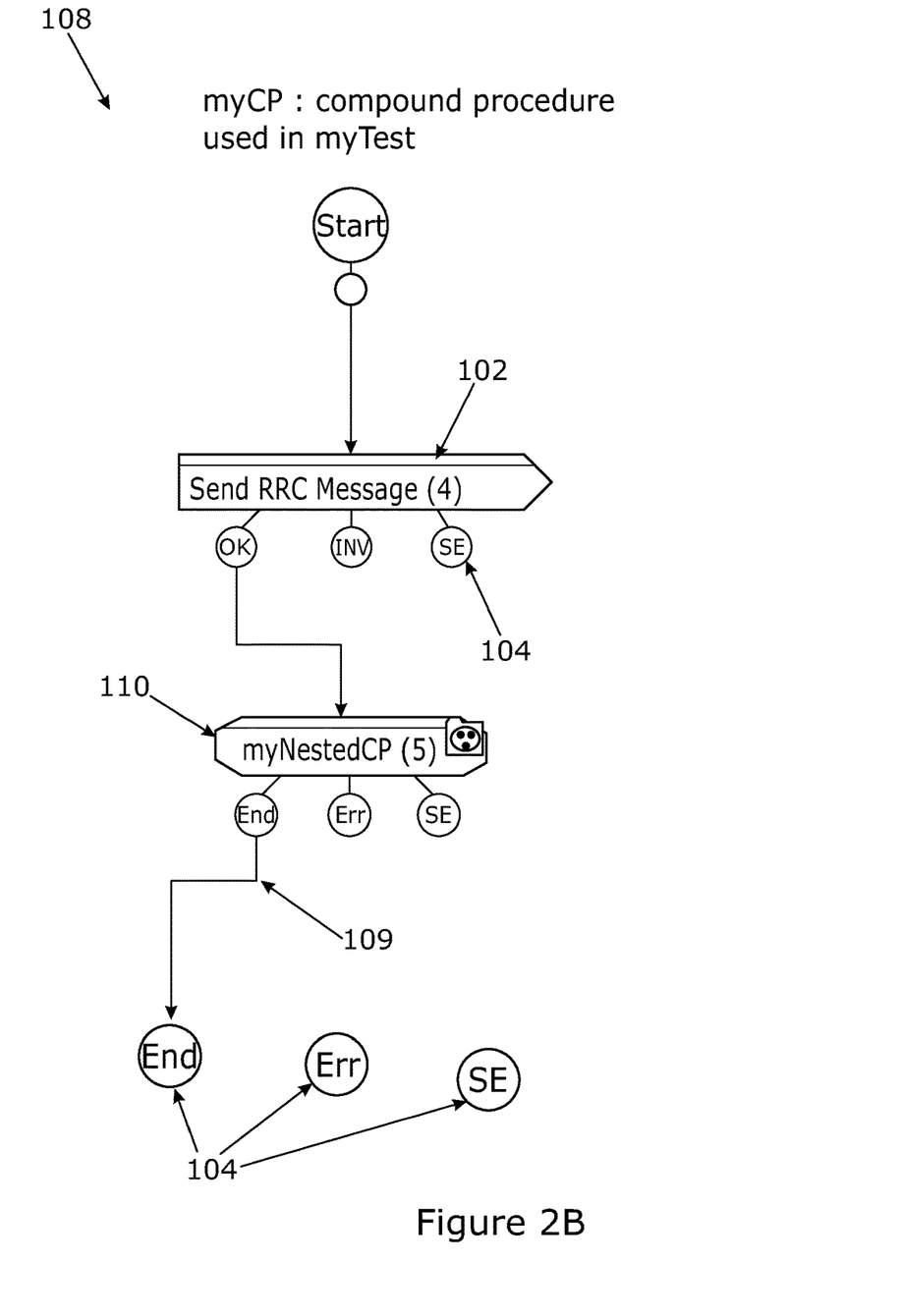
Figure 2C:
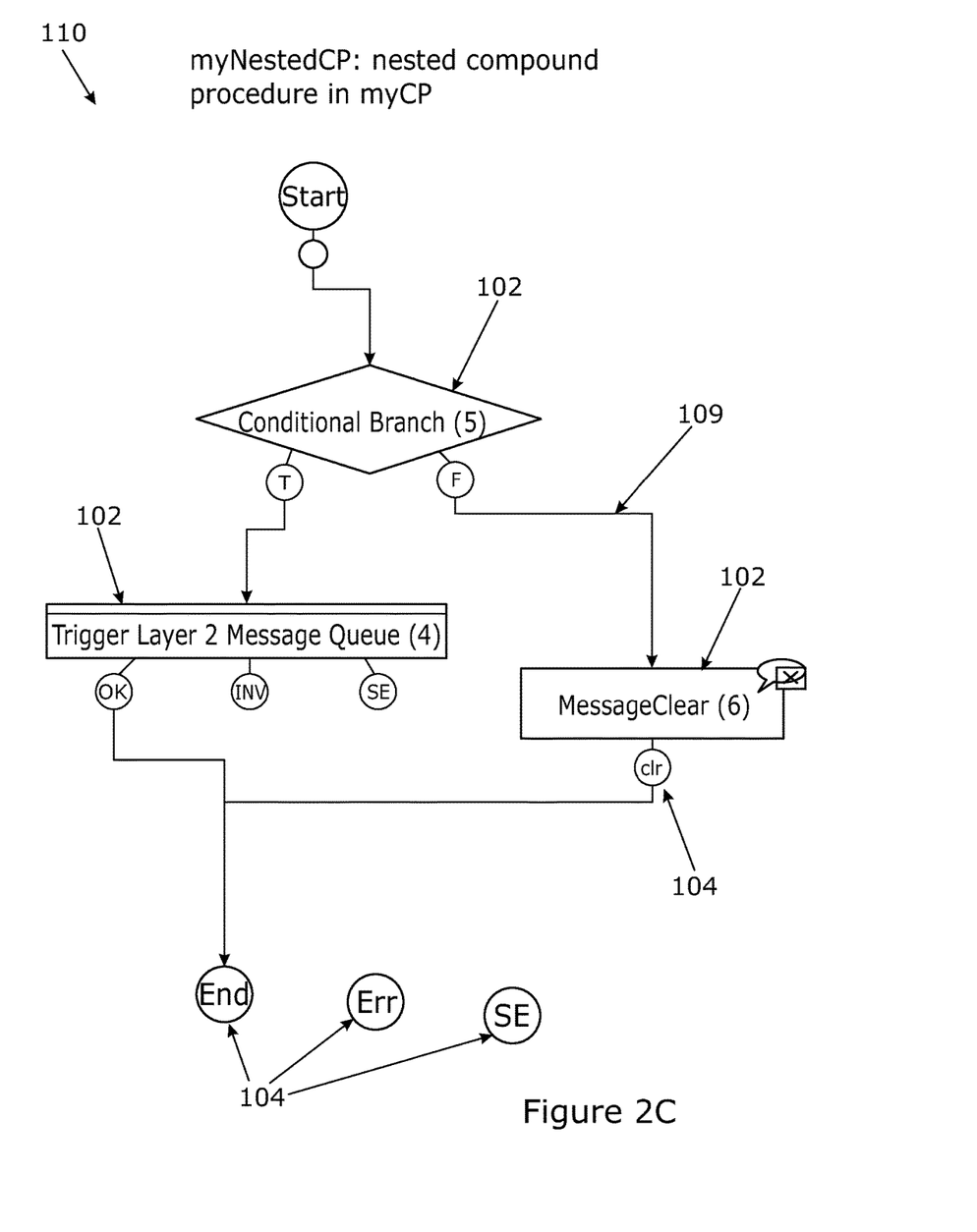

The compound test procedure 108 is shown in FIG. 2B, and consists of test procedures 102 and a further compound test procedure 110. The test outcomes 104 of the test procedure 108 are shown at the bottom of the test procedure 108 so that a test designer can connect the outcomes of test procedures 102, 110 executed within the test procedure 108 to an outcome of the test procedure. In a similar manner, the further compound test procedure 110 is shown in FIG. 2C comprising test procedures 102 connected as shown.

Figure 2D:
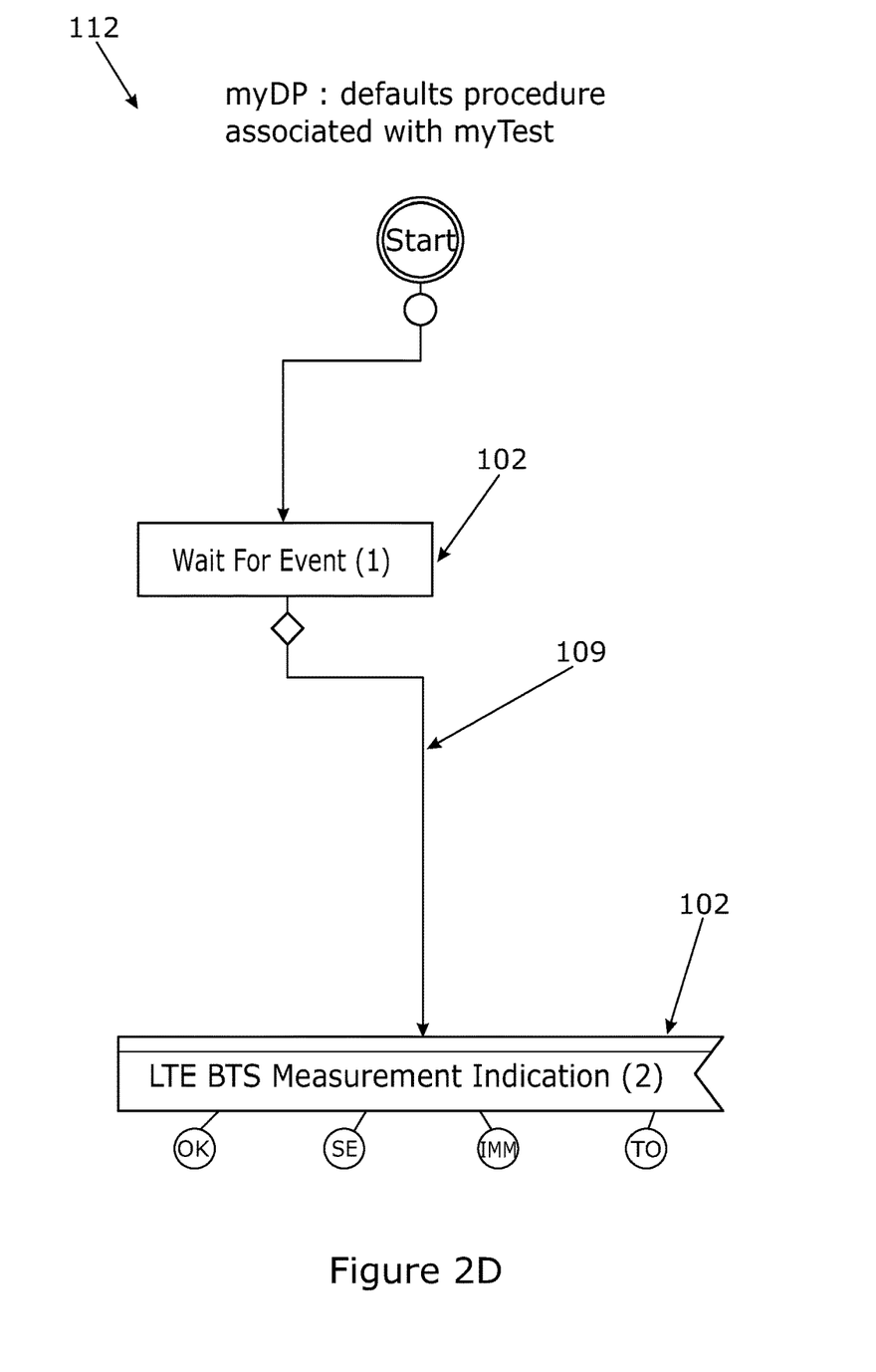

Further, a default procedure 112 is shown in FIG. 2D which is associated with the test operation 100 which also comprises the execution of test procedures 102. The default procedure 112 is executed by the test engine unit 14 in the background of executing the test operation 100. The default test procedure 112 enables the capture of messages defined within the test procedure definition during execution without requiring them to be defined in the main test procedure.

The test operation 100 shown in FIGS. 2A-2D contains three nested levels of test procedures, namely the test operation 100, compound test procedure 108 and further compound test procedure 110.

The test engine unit 14 receives a request to execute a test operation from a user of the mobile communication terminal test device 10 via a user input device (not shown). The test engine unit 14 retrieves a procedure definition for the test operation from a test procedure library 22.

Next, the test engine unit 14 initialises the test execution unit 16 by sending initialisation commands to it according to the procedure definition of the test operation. The initialisation commands are determined from test definition and the procedure libraries, and hence hardware instrument configurations, will be require to execute it. The test execution unit initialises the procedure libraries 24 and protocol codec 26. The protocol codec will be understood by those skilled in the art to include hardware instrument control and protocol codecs. Further initialisation instructions may be communicated to each hardware instrument 28 in order to configure the hardware instruments 28A, 28B and 28C into a desired operating mode according to the test operation.

If specified in the test procedure definition, configuration commands are communicated directly to the mobile communication terminal 12 by the test engine unit 14 via an AT MMI command proxy 36, such as via a USB cable. These configurations commands put the mobile communication terminal 12 into a desired operating state in order to test a specific operational aspect of the mobile communication terminal 12.

After initialisation is complete, the test engine unit 14 sends a run procedure request to the test execution unit 16 corresponding to the first procedure that appears after the start point in the test procedure flow diagram. Each run procedure request includes the test procedure's identifier and parameter definitions such as variables to be passed to procedures when executing them.

The test execution unit 16 receives the run procedure request from the test engine unit 14 and executes the test procedure by calling the execution procedure library with any supplied parameters. Execution of test procedures requires calls to specific protocol codec 26 provided in the test execution platform 16. Calls to protocol codec 26 typically result in messages being communicated to hardware instruments 28A, 28B and 28C, denoted generally at 28. The hardware instruments 28 operate as a base station simulators.

The test execution unit 16 communicates with the hardware instruments 28 using a transport protocol typically used by mobile telecommunication equipment, such as the transport control protocol/internet protocol (TCP/IP). Each hardware instrument 28 has its own IP address which the test execution unit 16 uses to send and receive messages to and from the hardware instrument 28. In this manner, the mobile communication terminal test device 10 is able to simulate the operation of mobile network equipment and base stations using the same communication protocols to enable thorough testing of the mobile communication terminal 12. For example, the hardware instruments 28A, 28B and 28C could be configured to communicate using CDMA, 3G and 4G/LTE cellular communication systems respectively. It should be appreciated that other configurations are possible according to the test operation.

Figure 5:
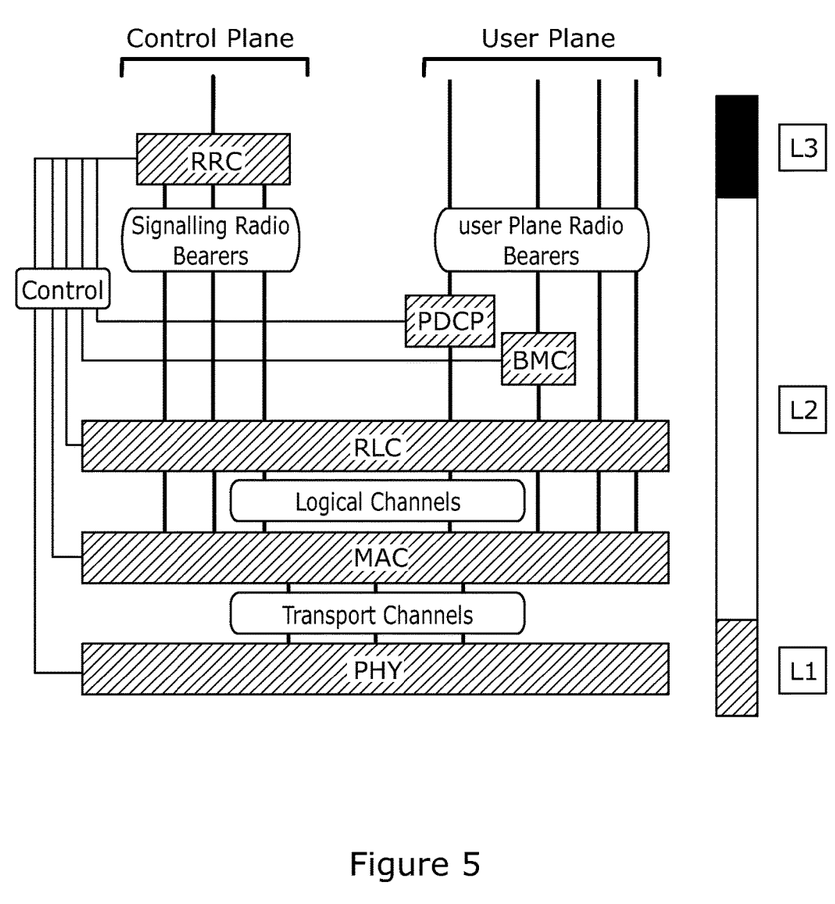
FIG. 5 is a block diagram of open systems interconnection layer 1 to layer 3 protocols used by the mobile communication terminal test device of FIG. 1.

A radio frequency interface protocol model used by the mobile communication terminal test device 10 is shown in FIG. 5, with layer 1 to layer 3 marked according to the OSI model. As can be seen, there are multiple protocols employed. The protocol codec 26 of the test execution unit 16 sends and receives messages for each protocol layer to and from the hardware instruments 28 in order to simulate various aspects of a mobile telecommunication system.

The test execution unit 16 stores a copy of each message sent to each hardware instrument 28 and of each message received from each hardware instrument 28 in a message log 32. Each message is stored in the log 32 with a timestamp corresponding to the elapsed time since the test operation began execution at which the message was transmitted or received.

When the test execution unit 16 completes executing a test procedure a run procedure return messages sent to the test engine unit 14. The run procedure return includes the outcome of the test procedure execution according to the procedure definition parameters.

The test procedure definition may include a specification of messages which may be sent or received during execution of the test procedure, a copy of which are to be communicated to the test engine unit 14. The specification is decided by the test designer to provide meaningful information to a user executing the test. Typically, many messages are sent and received by the protocol layers to the hardware instruments and providing all these messages to a user would not always be helpful in determining the cause of a failed test execution. Thus, the test designer is able to specify which messages are communicated to the test engine unit 14; such messages are referred to as console messages.

The test engine unit 14 stores a list of test procedures executed along with test outcomes and console messages in a test log 34.

The test engine unit 14 determines from the test procedure execution outcome received from the test execution unit 16 and the test procedure definition the next test procedure to execute. The test engine unit then retrieves the next test procedure definition from the procedure library 22 and sends a run procedure request to the test execution unit 16. In this manner, a test operation, test procedure or campaign of tests can be run by the mobile communication terminal test device 10.

Once the test operation has completed, the test engine unit 14 sends a shutdown command to the test execution unit 16, which then closes the procedure libraries 24, protocol codec 26, stops the message log 32 and shuts down the hardware instruments 28. Thus, each test is a self-contained operation of the mobile communication terminal test device 10.

During execution of a test operation, the display control unit 20 periodically sends an update request to the test engine unit 14. In the embodiment, this is implemented as the display control unit 20 polling the test engine unit 14. In response to the update request the test engine unit 14 sends an update response to the display control unit 20 consisting of entries from the test log 34 with a timestamp later than the previous update request from the display control unit 20.

The display control unit 20 produces a hierarchical trace of test execution from the update response and displays the trace on the display unit 18. In one arrangement, the display control unit 18 determines the nested execution level of its test procedure in the update request according to the timestamp and test procedure identifier contained in the update response. In this arrangement, the test engine unit 14 also includes nested procedure level with each test log 34 entry when sending the update response to the display control unit 20. In an alternative arrangement, the display control unit 20 requests nested execution level information from the test engine unit 14 for each test procedure entry contained in the display update.

Console messages can be associated with the execution of a specific test procedure in the hierarchical trace. This is achieved by comparing the timestamp of console messages and test procedures, such that console messages with a timestamp after the timestamp of a test procedure execution commencement are associated with that test procedure until a subsequent test procedure execution timestamp appears. When this association is combined with a nested execution level for each test procedure, the display control unit 20 is able to produce a hierarchical trace of test execution and of consoles messages.

Figure 3:
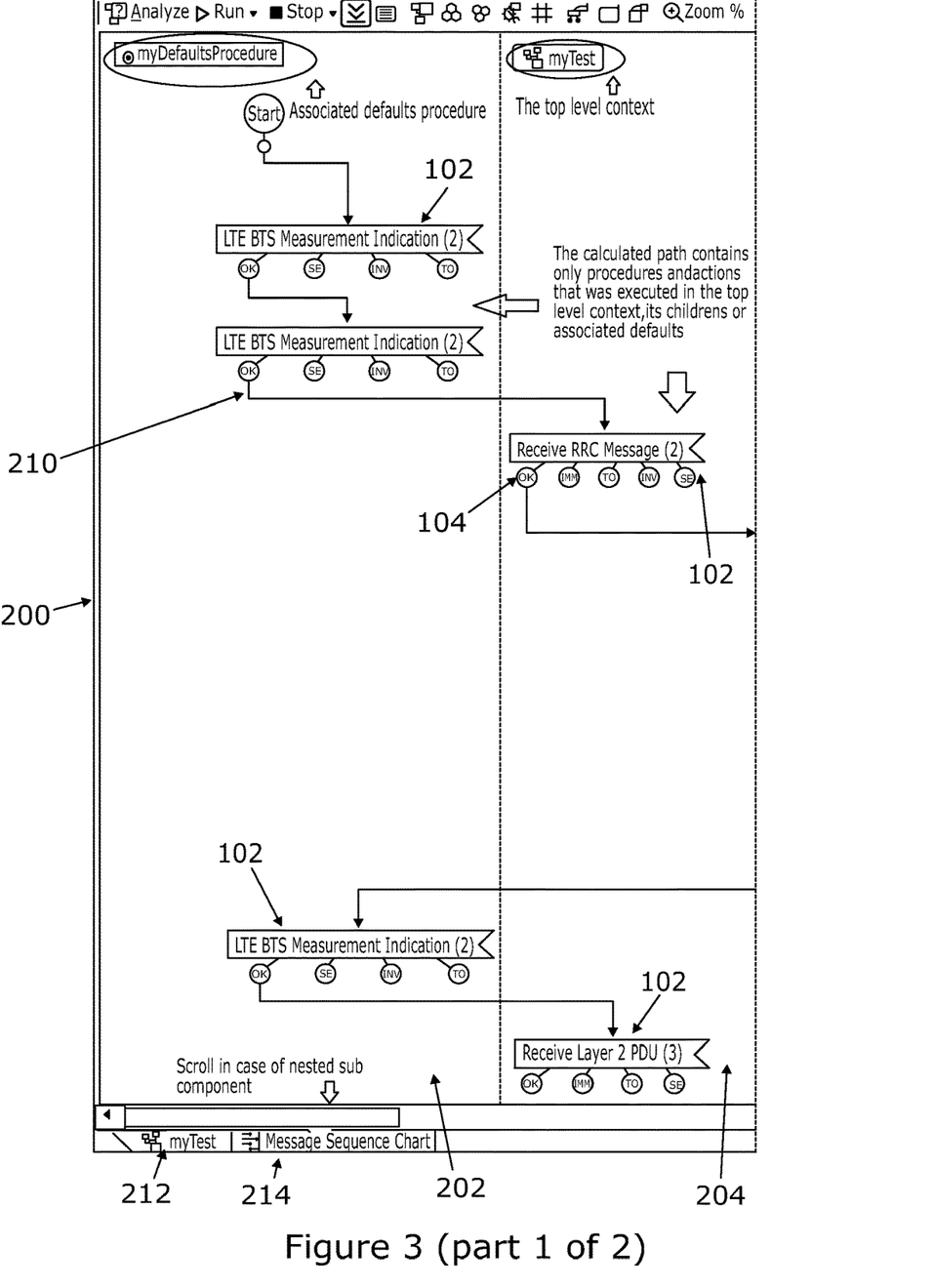
FIG. 3 shows a hierarchical trace of executed test procedures arranged by nested execution level displayed by the mobile communication terminal test device of FIG. 1.

FIG. 3 shows an example execution trace 200 produced by the display control unit 20 and displayed on the display unit 18. The execution trace 200 in FIG. 3 shows one example of an execution path for the test operation 100 shown in FIG. 2A. The execution trace 200 is divided into vertical sections 202, 204, 206 and 208 corresponding to execution within the default procedure 112, test procedure 100, compound test procedure 108 and further compound procedure 110, respectively. As seen in FIGS. 2A-2D, the compound test procedure 108 is a child of test procedure 100, and further compound procedure 110 is a child of compound test procedure 108.

Test execution commences with initialising the default procedure 112 and execution of test procedures 102 are shown in a vertically descending manner so that execution can be read from top to bottom of the execution trace. The horizontal location of each test procedure 102 within the execution trace 200 is determined by the display control unit 20 to correspond to the section 202, 204, 206 and 208 associated with the test procedure 100, child test procedure 108, further child test procedure 110 or defaults procedure 112 within which the test procedure was executed. Thus, all test procedures executed within the child test procedure 110 are vertically aligned within the section 208.

The display control unit 20 shows only the executed and executing test procedures of the test 100 in execution trace 200 to simplify the display to the user. Further, branch lines 210 showing the path of execution from one test procedure to 102 to the next are only displayed if they were followed by the test engine unit 14.

The execution trace 200 enables the user of the mobile communication terminal test device 10 to see a graphical representation of the execution of a test, showing test outcomes 104 for each test procedure 102 and also a parent test procedure where test procedure is executed as a child. This enables a user to see the context of a particular test procedure so that if a mobile communication terminal 12 were to fail a test, the user would see the parent test procedure(s) of the specific test procedure where the failed test occurred. This provides a superior test execution display and debugging ability to a user compared to simply providing the current test procedure 102 execution details without any parent context.

The execution trace 200 shown in FIG. 3 includes an execution path tab 212 showing the test execution path seen in FIG. 3 and a message sequence tab 214 for displaying console messages.

Figure 4:
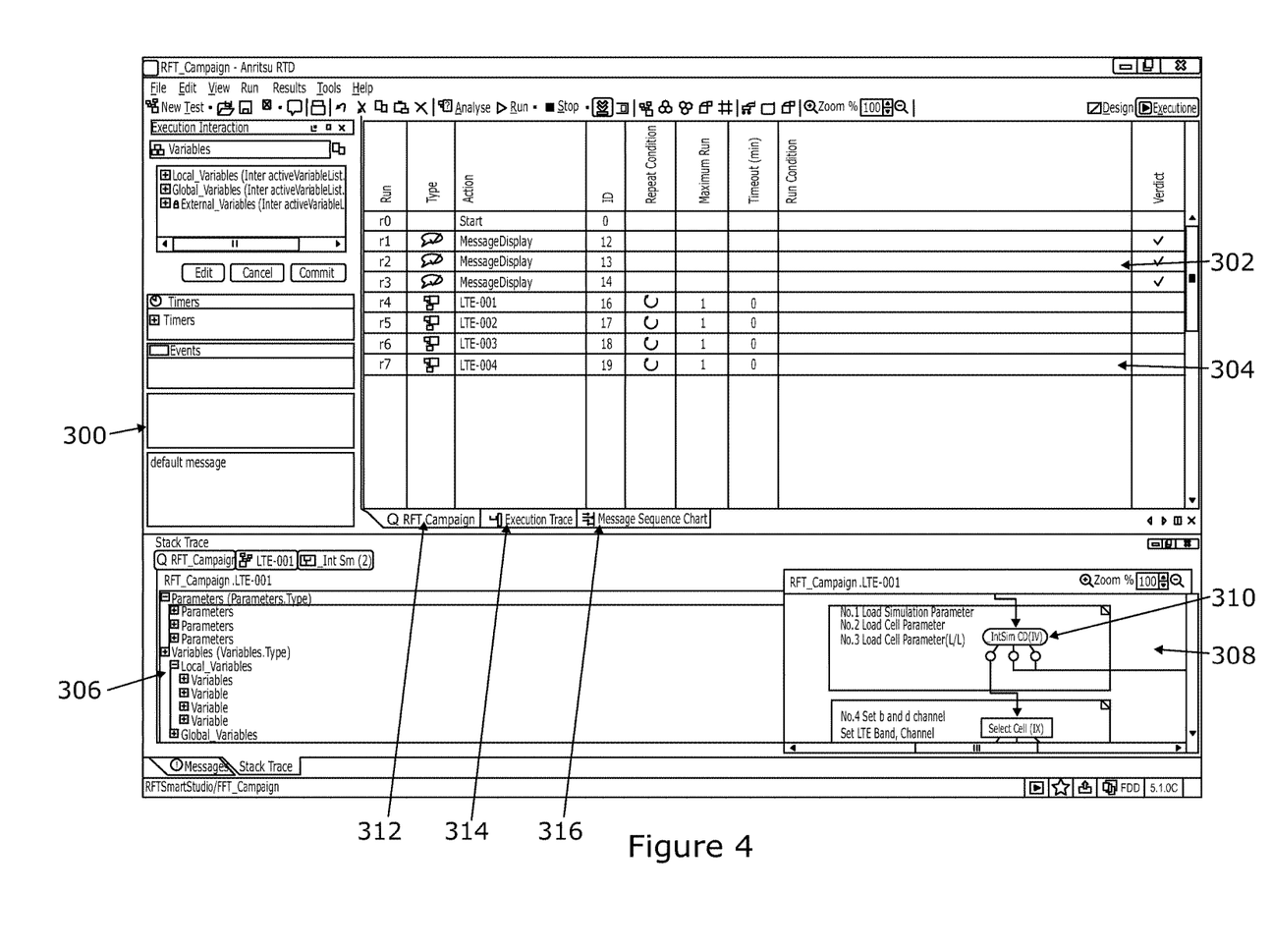
FIG. 4 shows a test campaign display shown on the mobile communication terminal test device of FIG. 1.

FIG. 4 shows a preferred campaign execution trace 300 produced by the display control unit 20 of the embodiment. The campaign execution trace 300 includes a test pane 302 in which a list of tests 304 forming part of a test campaign are displayed. The trace 300 further includes a stack trace pane 306 in which parameters of a test selected by user in the test pane 302 are displayed. The execution trace 300 further includes a test execution trace pane 308 in which a currently executing test procedure 310 is displayed. As shown in FIG. 4, in the embodiment, information on test procedures that may be executed depending on the outcome of the current test procedure is also shown in the test execution trace pane 308 using similar display methodology to that shown in FIG. 3.

The campaign execution trace 300 provides a display for user who is running a campaign of tests, such as during regression testing of the mobile communication terminal 12. In such regression testing, it is not uncommon for hundreds of tests to be performed. Selecting each test individually would be laborious and slow down testing of the mobile communication terminal 12. Thus, a campaign consisting of a list of tests shown in the test pane 302 can be selected by user for execution.

The mobile communication terminal test device 10 executes each test in turn, with information on the currently executing test being shown in the stack trace pane 306 and execution trace pane 308.

The test pane 302 includes a campaign tab 312, an execution trace tab 314 and a message chart tab 316. The campaign tab 312 is shown in FIG. 4, whilst the execution trace 314 corresponds to a display similar to that shown in FIG. 3. The display corresponding to a message chart tab 316 will be described below with reference to FIG. 6.

Advantageously, a user is able to select any test which is either executing or has been executed in the campaign pane 302, and is then able to view the execution path using the execution trace tab 314, and see the corresponding messages using the message tab 316. This is particularly beneficial when the mobile communication terminal test device 10 has been left unattended executing a large number of tests. A user returning to the device 10 can determine from the test pane 302 which tests have failed, select a failed test and investigate where the failure occurred such as by viewing a hierarchical display of messages as described above.

Figure 6:
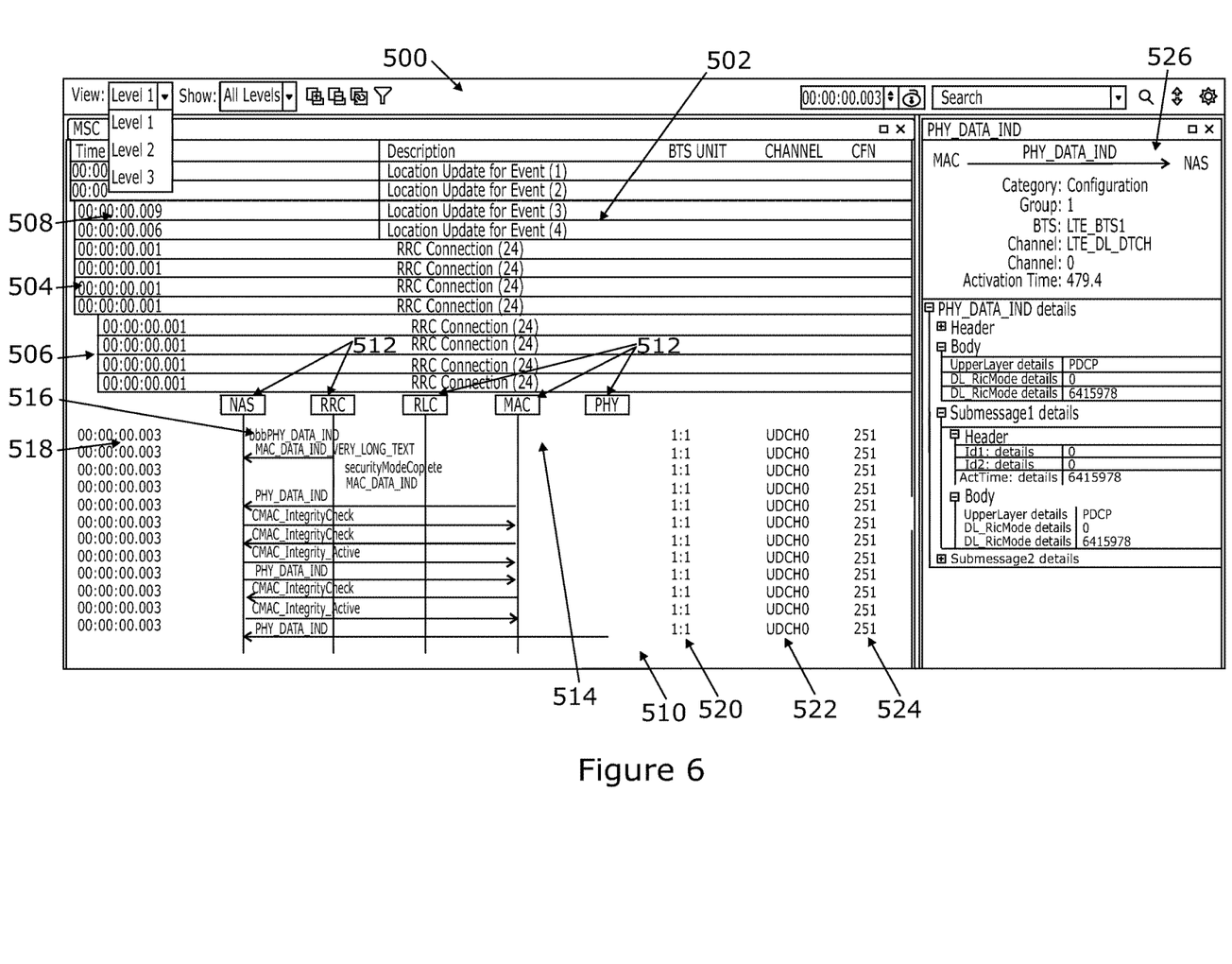
FIG. 6 shows a hierarchical trace of executed test procedures and protocol messages displayed by the mobile communication terminal test device of FIG. 1.

Referring now to FIG. 6, there is shown a second hierarchical trace 500 of test procedure execution and test outcomes produced by the display control unit 20. In the second hierarchical trace 500 the test outcomes are in the form of protocol messages. Executed and executing test procedures are shown in the second hierarchical trace at 502 with nested levels of execution represented by indentations shown at 504 and 506. Next to each test procedure in the hierarchical trace 500 the timestamp of execution of that test procedure is shown, indicated in FIG. 6 at 508. Timestamp values start at 0 at the beginning of the test operation, so that the displayed timestamps 508 correspond to the elapsed time since the beginning of the test.

Beneath the test procedures displayed at 502 there is displayed a message panel 510 in which protocol messages sent and received during execution of the selected test procedure are displayed. The message panel 510 includes protocol indicators 512 for each of the protocols in the protocol reference model shown in FIG. 5. Each protocol message is represented in the message panel 510 by a horizontal arrow 514 which indicates the direction of the protocol message communication. The name of the protocol message is displayed above the horizontal arrow 514 at 516. A timestamp 518 of the protocol message is shown to the left of the horizontal arrow 514. To the right of each horizontal arrow 514 there is shown additional physical transport information about the message such as a base transceiver station (BTS) indicator 520, a channel indicator 522 and a CFN indicator 524. The BTS indicator 520 identifies which hardware instrument 28A, 28B or 28C each protocol message was sent to or received from. The CFN indicator 524 shows the control frame number associated with each message.

The display control unit 20 displays the protocol messages in the message panel vertically according to ascending timestamp of the message. In one arrangement, the display control unit 20 retrieves the protocol messages from the message log 32. In an alternative arrangement, the display control unit 20 displays protocol messages stored in the test log 34. All messages sent and received during execution of the selected test procedure are displayed in the message panel 510, including messages sent and received during execution of child procedures. The hierarchical display of test procedure execution allows user to select either a high-level test procedure and view all of the protocol messages for that test procedure or, should further investigation be required, a child test procedure can be selected so that any messages sent and received during execution of the child procedure are displayed in the message panel 510. This allows a user to quickly focus on messages related to a test procedure where a test may have failed, or alternatively view messages of the parent test procedure which may have precipitated the failure in a child test procedure.

The hierarchical trace 500 produced by the display control unit 20 also includes a message detail panel 526 in which details of a selected protocol message are displayed to assist the user with debugging and confirming correct operation of the mobile communication terminal 12.

Each test procedure definition may include one or more breakpoints determined by a user. The test engine unit 14 records each breakpoint in the test log 34 but otherwise ignores the breakpoint such that execution of test procedures in each test operation continues irrespective of breakpoints. The display control unit 20 responds to breakpoints in the display update by pausing the hierarchical trace on the display unit 18 until a resume input is received from a user. In this manner, the mobile communication terminal test device 10 is able to continue executing test procedures, which may involve time sensitive message exchanges, whilst pausing an execution trace displayed to a user to enable inspection of a test procedure.

Modifications and variations such as would be apparent to a person skilled in the art are within the scope of the invention.

The invention claimed is:

1. A mobile communication terminal test device that communicates with a mobile communication terminal to perform a test operation, comprising:
   a display unit;
   a test engine unit that determines, during performance of a test operation, a test procedure to be executed as part of the test operation and communicates said test procedure to a test execution unit;
   a test execution unit that executes said test procedure and returns an outcome of said test procedure execution to the test engine unit, whereby the outcome is used by the test engine unit in determining a subsequent test procedure to be executed;
   and a display control unit that produces a hierarchical trace of executed test procedures arranged by nested execution level, whereby a child test procedure determined by the test engine unit to be executed as part of executing a parent test procedure is indicated by the display control unit at a lower nested execution level than the parent test procedure,
   wherein the display control unit displays a screen indicating the hierarchical trace of executed test procedures and their outcomes on the display unit,
   wherein the display control unit displays only executed and executing test procedures in the hierarchical trace.

2. The mobile communication terminal test device of claim 1, wherein the test engine unit stores a test log, each entry in the test log corresponding to either a test procedure determined to be executed or an outcome of a test procedure execution received from the test execution unit, the test engine unit storing a timestamp with each entry in the test log, the display control unit creating the hierarchical trace from entries in the test log.

3. The mobile communication terminal test device of claim 2, wherein the display control unit determines the nested execution level of each test procedure based on the timestamps of test log entries.

4. The mobile communication terminal test device of claim 2, wherein the display control unit requests the nested execution level of each test procedure from the test engine unit.

5. The mobile communication terminal test device of claim 1, wherein each test procedure definition may include a breakpoint, the test engine unit arranged to ignore each breakpoint such that execution of test procedures in each test operation continues irrespective of breakpoints, the display control unit arranged to respond to breakpoints by pausing the hierarchical trace on the display unit until a resume input is received from a user.

6. The mobile communication terminal test device of claim 1, wherein the display control unit displays outcomes of executed and executing test procedures in the hierarchical trace, and further displays branch indicators connecting a determined outcome of each executed test procedure to the subsequently executed test procedure.

7. The mobile communication terminal test device of claim 2, wherein the display control unit displays executed and executing test procedures in the execution trace arranged according to each test procedure's execution timestamp.

8. The mobile communication terminal test device of claim 2, wherein the test engine unit further stores protocol messages received from the test execution unit in the test log, the display control unit displaying on the hierarchical trace each message sent or received during execution of a test procedure selected by a user.

9. A method for testing a mobile communication terminal by performing a test operation, comprising the steps of:
   determining, during performance of the test operation, a test procedure to be executed as part of a test operation;
   executing said test procedure and returning an outcome of said test procedure execution, whereby the outcome is used in determining a subsequent test procedure to be executed;
   producing a hierarchical trace of executed test procedures arranged by nested execution level, whereby a child test procedure determined to be executed as part of executing a parent test procedure is displayed at a lower nested execution level than the parent test procedure; and
   displaying a screen indicating the hierarchical trace of executed test procedures and their outcomes;
   wherein the step of displaying a screen comprises displaying only executed and executing test procedures in the hierarchical trace.

10. The method for testing a mobile communication terminal of claim 9, wherein the method further comprises the steps of storing entries in a test log, each entry in the test log corresponding to either a test procedure determined to be executed or an outcome of a test procedure execution, and storing a timestamp with each entry in the test log, wherein the step of displaying a screen indicating a hierarchical trace of executed test procedures further comprises retrieving entries from the test log and displaying the screen based on the retrieved entries.

11. The method for testing a mobile communication terminal of claim 10, further comprising the step of determining the nested execution level of each test procedure based on the retrieved test log entries.

12. The method for testing a mobile communication terminal of claim 9, each test procedure definition may include a breakpoint, the method further comprising the steps of continuing execution of test procedures irrespective of break points and pausing displaying a screen upon encountering a breakpoint until a resume input from a user is received.

13. The mobile communication terminal test device of claim 1, further comprising a test procedure library storing a procedure definition for each test operation and test procedure, each procedure definition including a unique identifier, one or more parameters and test outcomes, a list of any child test procedures to be executed, and branch information defining a test flow, wherein the test engine unit determines a subsequent test procedure to be executed according to the procedure definition of the test operation being performed.

14. The mobile communication terminal test device of claim 13, wherein each test procedure definition may include a breakpoint, the test engine unit arranged to ignore each breakpoint such that execution of test procedures in each test operation continues irrespective of breakpoints, the display control unit arranged to respond to breakpoints by pausing the hierarchical trace on the display unit until a resume input is received from a user.

15. The method for testing a mobile communication terminal of claim 9, further comprising the step of storing a procedure definition for each test operation and test procedure, each procedure definition including a unique identifier, one or more parameters and test outcomes, a list of any child test procedures to be executed, and branch information defining a test flow, wherein the procedure definition of the test operation being performed is used in a step of determining a subsequent test procedure to be executed.

16. The method for testing a mobile communication terminal of claim 15, wherein each test procedure definition may include a breakpoint, the method further comprising the steps of continuing execution of test procedures irrespective of breakpoints and pausing displaying a screen upon encountering the breakpoint until a resume input is received from a user.

* * * * *